(12) United States Patent
Seiden et al.

(10) Patent No.: US 12,248,459 B2
(45) Date of Patent: Mar. 11, 2025

(54) VERSIONING IN EDITABLE TABLES

(71) Applicant: SIGMA COMPUTING, INC., San Francisco, CA (US)

(72) Inventors: Max H. Seiden, San Francisco, CA (US); Rodolphe Gagneron, San Diego, CA (US); Gregory G. Owen, San Mateo, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 253 days.

(21) Appl. No.: 17/559,711

(22) Filed: Dec. 22, 2021

(65) Prior Publication Data

US 2023/0143272 A1     May 11, 2023

Related U.S. Application Data

(60) Provisional application No. 63/278,356, filed on Nov. 11, 2021.

(51) Int. Cl.
| | |
|---|---|
| *G06F 16/23* | (2019.01) |
| *G06F 16/21* | (2019.01) |
| *G06F 16/22* | (2019.01) |
| *G06F 16/2458* | (2019.01) |
| *G06F 16/25* | (2019.01) |
| *G06F 16/28* | (2019.01) |
| *G06F 21/62* | (2013.01) |

(52) U.S. Cl.
CPC ........ *G06F 16/2379* (2019.01); *G06F 16/219* (2019.01); *G06F 16/2282* (2019.01); *G06F 16/2474* (2019.01); *G06F 16/254* (2019.01); *G06F 16/283* (2019.01); *G06F 21/6227* (2013.01); *G06F 21/6245* (2013.01)

(58) Field of Classification Search
None
See application file for complete search history.

(56) References Cited

U.S. PATENT DOCUMENTS

| | | | |
|---|---|---|---|
| 6,480,857 B1 | 11/2002 | Chandler | |
| 7,509,332 B1 | 3/2009 | Milby | |
| 7,949,633 B1 | 5/2011 | Shaver et al. | |
| 8,375,011 B2 * | 2/2013 | Fox | G06F 16/23 707/695 |
| 8,510,266 B1 | 8/2013 | Ho et al. | |
| 8,676,772 B2 | 3/2014 | Gislason | |
| 9,690,764 B1 * | 6/2017 | Batni | G06F 40/103 |

(Continued)

FOREIGN PATENT DOCUMENTS

WO     2023086504 A1     5/2023

OTHER PUBLICATIONS

International Search Report and Written Opinion, PCT/US2022/049594, Feb. 17, 2023, 14 pages.

*Primary Examiner* — Richard L Bowen

(57) ABSTRACT

Versioning in editable tables including receiving, by a table manager via a client computing system, an instruction to edit a first row in an editable table in a cloud-based data warehouse, wherein the instruction comprises a column value; determining, by the table manager, a version value for the edit to the first row; and generating, by the table manager, a database statement instructing the cloud-based data warehouse to create, in the editable table, a second row including the version value and the column value.

18 Claims, 6 Drawing Sheets

(56) References Cited

U.S. PATENT DOCUMENTS

| | | |
|---|---|---|
| 10,025,801 B2 | 7/2018 | Kaufman et al. |
| 10,599,650 B2* | 3/2020 | Baeuerle ............ G06F 16/24535 |
| 10,621,203 B2 | 4/2020 | Hunt et al. |
| 10,713,178 B2 | 7/2020 | Yen et al. |
| 10,885,051 B1 | 1/2021 | Peters et al. |
| 10,929,384 B2 | 2/2021 | Karunanithi et al. |
| 10,956,447 B2 | 3/2021 | Arnold et al. |
| 10,990,571 B1* | 4/2021 | Zhang ................. G06F 16/2379 |
| 11,100,101 B2 | 8/2021 | Zhao et al. |
| 11,137,987 B2 | 10/2021 | Namarvar et al. |
| 11,163,791 B2 | 11/2021 | Patel et al. |
| 11,216,422 B2 | 1/2022 | Cosic |
| 11,354,493 B2 | 6/2022 | Von Tish et al. |
| 11,443,110 B2 | 9/2022 | Davis et al. |
| 11,636,408 B2 | 4/2023 | Sit et al. |
| 11,693,549 B2 | 7/2023 | Stojanovic et al. |
| 11,709,809 B1 | 7/2023 | Li et al. |
| 2003/0177481 A1* | 9/2003 | Amaru .................... G06F 16/25 717/148 |
| 2003/0217033 A1 | 11/2003 | Sandler et al. |
| 2004/0088334 A1* | 5/2004 | Klein .................... G06F 16/219 707/999.203 |
| 2004/0103365 A1 | 5/2004 | Cox |
| 2005/0097187 A1 | 5/2005 | Thompson et al. |
| 2007/0033518 A1 | 2/2007 | Kenna et al. |
| 2007/0043706 A1 | 2/2007 | Burke et al. |
| 2009/0276692 A1 | 11/2009 | Rosner |
| 2010/0100558 A1 | 4/2010 | Bakalash et al. |
| 2010/0211862 A1 | 8/2010 | Parish et al. |
| 2010/0262647 A1 | 10/2010 | Malek et al. |
| 2010/0281372 A1 | 11/2010 | Lyons et al. |
| 2014/0229424 A1 | 8/2014 | Gislason |
| 2015/0120687 A1 | 4/2015 | Bhattacharjee et al. |
| 2016/0162461 A1 | 6/2016 | Simon et al. |
| 2016/0321232 A1 | 11/2016 | Tan et al. |
| 2016/0321233 A1 | 11/2016 | He et al. |
| 2016/0378737 A1 | 12/2016 | Keslin et al. |
| 2017/0277743 A1 | 9/2017 | Jain et al. |
| 2017/0286454 A1 | 10/2017 | Saeki et al. |
| 2018/0082289 A1 | 3/2018 | Johnson et al. |
| 2018/0096043 A1 | 4/2018 | Ledbetter et al. |
| 2018/0351781 A1 | 12/2018 | Movsisyan et al. |
| 2019/0095413 A1 | 3/2019 | Davis et al. |
| 2019/0206231 A1 | 7/2019 | Armstrong et al. |
| 2019/0294688 A1 | 9/2019 | Mohan |
| 2019/0392063 A1 | 12/2019 | Tosukhowong et al. |
| 2020/0034365 A1 | 1/2020 | Martin et al. |
| 2020/0150938 A1 | 5/2020 | Stachura |
| 2021/0081364 A1 | 3/2021 | Jiang et al. |
| 2021/0081605 A1 | 3/2021 | Smith et al. |
| 2021/0149858 A1 | 5/2021 | Xia et al. |
| 2021/0192601 A1 | 6/2021 | Dandy et al. |
| 2022/0043779 A1 | 2/2022 | Maddila et al. |
| 2023/0143272 A1 | 5/2023 | Seiden et al. |
| 2023/0145697 A1 | 5/2023 | Seiden et al. |
| 2023/0146077 A1 | 5/2023 | Seiden et al. |
| 2023/0147197 A1 | 5/2023 | Seiden et al. |
| 2023/0147424 A1 | 5/2023 | Seiden et al. |
| 2023/0195744 A1 | 6/2023 | Owen et al. |

* cited by examiner

VERSIONING IN EDITABLE TABLES

CROSS-REFERENCE TO RELATED APPLICATIONS

This application is a non-provisional application for patent entitled to a filing date and claiming the benefit of earlier-filed U.S. Provisional Patent Application Ser. No. 63/278,356, filed Nov. 11, 2021, the contents of which are incorporated herein by reference in their entirety.

BACKGROUND

Field of the Invention

The field of the invention is data processing, or, more specifically, methods, apparatus, and products for versioning in editable tables.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for versioning in editable tables including receiving, by a table manager via a client computing system, an instruction to edit a first row in an editable table in a cloud-based data warehouse, wherein the instruction comprises a column value; determining, by the table manager, a version value for the edit to the first row; and generating, by the table manager, a database statement instructing the cloud-based data warehouse to create, in the editable table, a second row including the version value and the column value.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
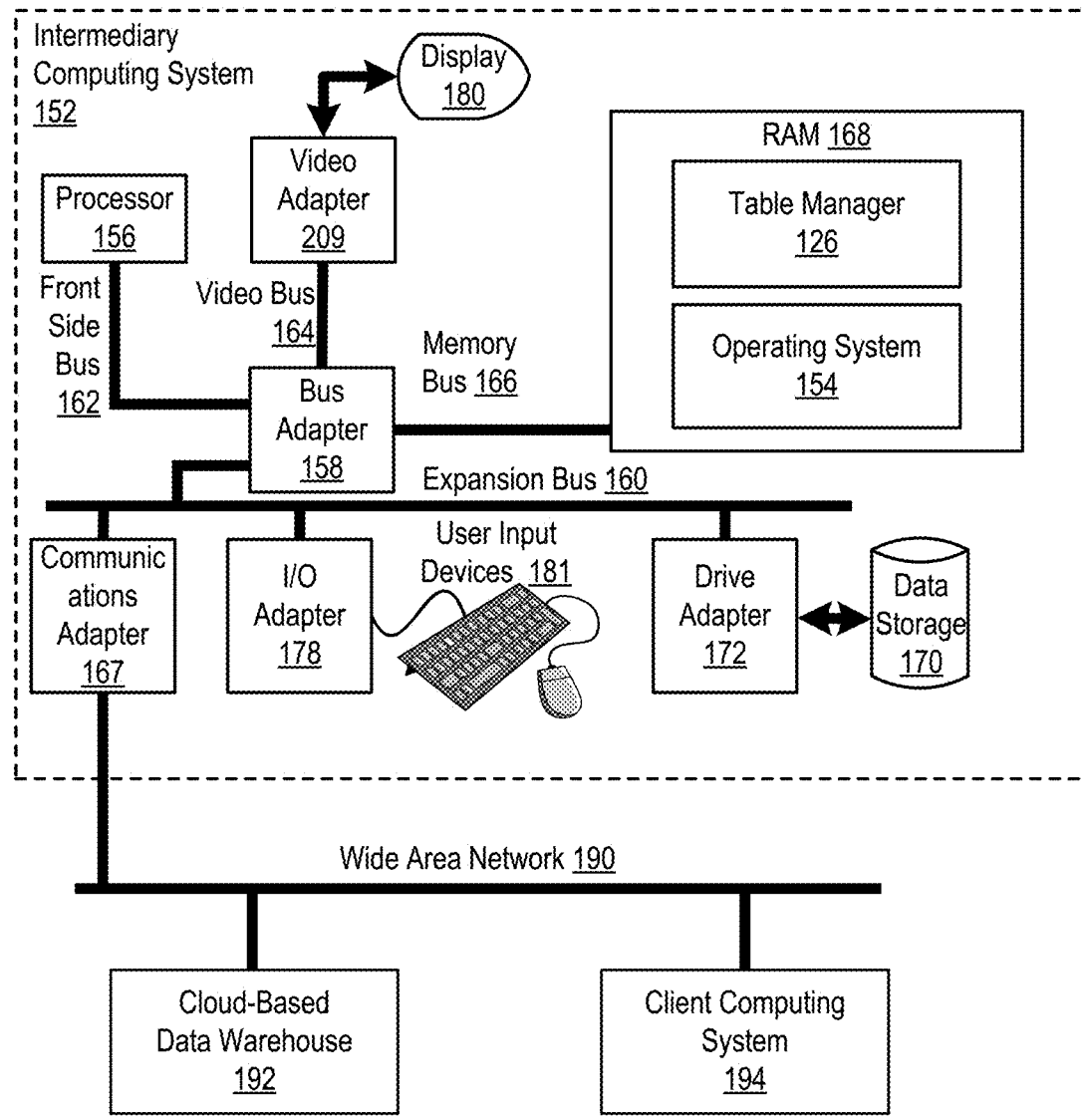
FIG. 1 sets forth a block diagram of an example system configured for versioning in editable tables according to embodiments of the present invention.

Exemplary methods, apparatus, and products for versioning in editable tables in accordance with the present invention are described with reference to the accompanying drawings, beginning with FIG. 1. FIG. 1 sets forth a block diagram of automated computing machinery comprising an exemplary intermediary computing system 152 configured for versioning in editable tables according to embodiments of the present invention. The intermediary computing system 152 of FIG. 1 includes at least one computer processor 156 or 'CPU' as well as random access memory 168 ('RAM') which is connected through a high speed memory bus 166 and bus adapter 158 to processor 156 and to other components of the intermediary computing system 152.

Stored in RAM 168 is an operating system 154. Operating systems useful in computers configured for versioning in editable tables according to embodiments of the present invention include UNIX™, Linux™, Microsoft Windows™, AIX™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the table manager 126, a module for versioning in editable tables according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for versioning in editable tables according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for versioning in editable tables according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the table manager 126.

Figure 2:
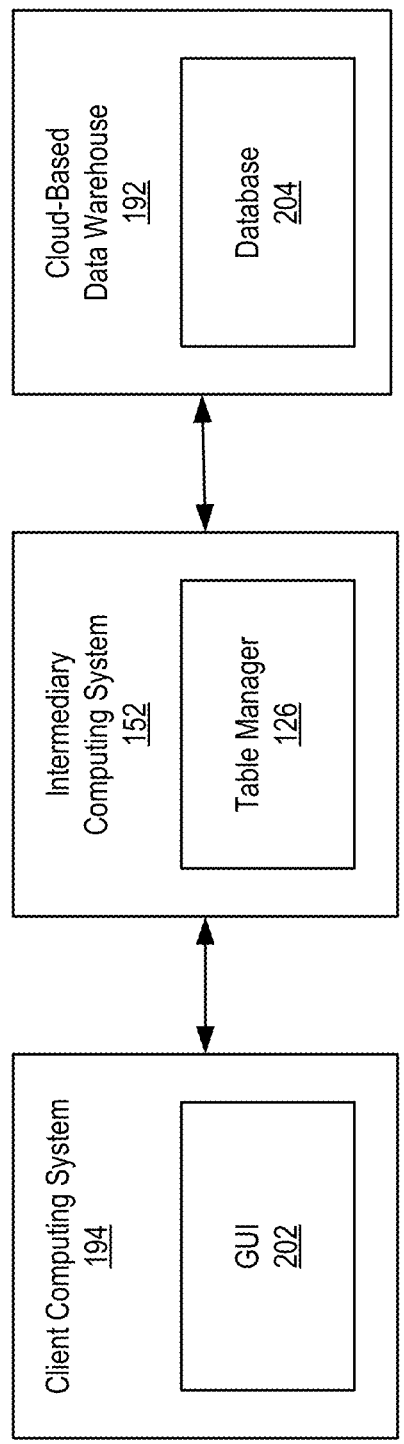
FIG. 2 sets forth a block diagram of an example system configured for versioning in editable tables according to embodiments of the present invention.

FIG. 2 shows an exemplary system for versioning in editable tables according to embodiments of the present invention. As shown in FIG. 2, the system includes a client computing system 194, an intermediary computing system 152, and a cloud-based data warehouse 192. The client computing system 194 includes a graphical user interface (GUI) 202. The intermediary computing system 152 includes a table manager 126. The cloud-based data warehouse 192 includes a database 204. The client computing system 194 may access the cloud-based data warehouse 192 and database 204 via the table manager on the intermediary computing system 152.

The GUI 202 is a visual presentation configured to present data sets in the form of worksheets, workbooks, and graphical elements to a user. The GUI 202 also receives requests from a user for data sets from the database 204. The GUI 202 may also present to the user the ability to add a new row into a data set or table and enter values for each column of the new row. The GUI 202 may be presented, in part, by the table manager 126 and displayed on a client computing system 194 (e.g., on a system display or mobile touchscreen). The GUI 202 may be part of an Internet application that includes the table manager 126 and is hosted on the intermediary computing system 152.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. Data sets may be sent from the cloud-based data warehouse 192 in response to a database statement (also referred to as a query). Accordingly, data sets retrieved in response to a database statement may be referred to as query results.

The table manager 126 is hardware, software, or an aggregation of hardware and software configured to receive instructions in the form of state specifications from the client computing system 194, via the GUI 202. The table manager 126 is also configured to generate database statements in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. Such manipulations and data may also indicate requests to create a new row and values for that new row. The state specification may be a standard file format used to exchange data in asynchronous browser-server communication. For example, the state specification may be a JavaScript Object Notation specification. The state specification may include descriptions of elements that are used to apply changes to the data set. Such elements may include filters applied to the worksheet, the hierarchical level of the worksheet, joins performed within the worksheet, exposable parameters in the worksheet, and security for the worksheet.

The table manager 126 uses the state specification as input to generate a database statement. This database statement generation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database statement.

The table manager 126 may use the database statement to fetch query results (i.e., a data set) from the database 204. The table manager 126 may then present the query results to a user via the GUI 202. The table manager 126 may further manage tables on the database 202 to which a user has made edits, such as adding new rows or editing existing rows. Further, the table manager 126 may add columns to new rows and create new tables on the database 202.

Figure 3:
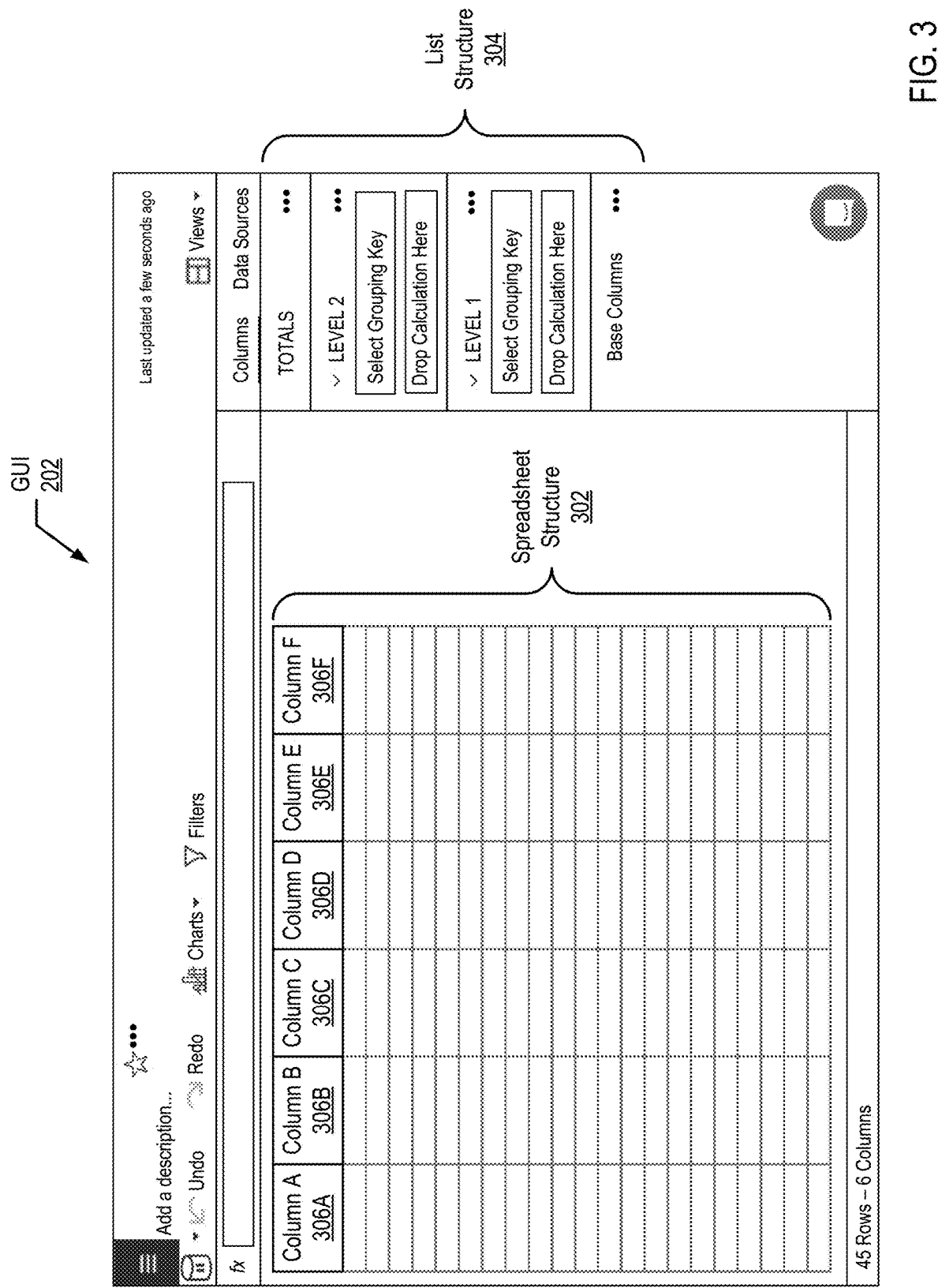
FIG. 3 sets forth a block diagram of an example system configured for versioning in editable tables according to embodiments of the present invention.

FIG. 3 shows an exemplary system for versioning in editable tables according to embodiments of the present invention. As shown in FIG. 3, the exemplary GUI 202 includes a spreadsheet structure 302 and a list structure 304. The spreadsheet structure 302 includes a worksheet (shown as empty rows) with six columns (column A 306A, column B 306B, column C 306C, column D 306D, column E 306E, column F 306F). The combination of a worksheet and dynamic graphic elements may be referred to as a workbook.

The spreadsheet structure 302 is a graphical element and organizing mechanism for a worksheet that presents a data set. A worksheet is a presentation of a data set (such as a table) from a database on a data warehouse. The spreadsheet structure 302 displays the worksheet as rows of data organized by columns (column A 306A, column B 306B, column C 306C, column D 306D, column E 306E, column F 306F). The columns delineate different categories of the data in each row of the worksheet. The columns may also be calculation columns that include calculation results using other columns in the worksheet.

The list structure 304 is a graphical element used to define and organize the hierarchical relationships between the columns (column A 306A, column B 306B, column C 306C, column D 306D, column E 306E, column F 306F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 304 presents a dimensional hierarchy to the user. Specifically, the list structure 304 presents levels arranged hierarchically across at least one dimension. Each level within the list structure 304 is a position within a hierarchical relationship between columns (column A 306A, column B 306B, column C 306C, column D 306D, column E 306E, column F 306F). The keys within the list structure 304 identify the one or more columns that are the participants in the hierarchical relationship. Each level may have more than one key.

One of the levels in the list structure 304 may be a base level. Columns selected for the base level provide data at the finest granularity. One of the levels in the list structure 304 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 306A, column B 306B, column C 306C, column D 306D, column E 306E, column F 306F) into the list structure 304. The order of the list structure 304 may specify the hierarchy of the columns relative to one another. A user may be able to drag and drop the columns in the list structure 304 at any time to redefine the hierarchical relationship between columns. The hierarchical relationship defined using the columns selected as keys in the list structure 304 may be utilized in charts such that drilling down (e.g., double click on a bar), enables a new chart to be generated based on a level lower in the hierarchy.

The GUI 202 may also include a mechanism for a user to request a table from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the table manager 126. Such a mechanism may also include a direct identification of the rows and columns of a database table that a user would like to access (e.g., via a selection of the rows and columns in a dialog box). The GUI 202 may also include a mechanism for a user to create a new table on the database, add rows to a table, and move rows within the table.

Figure 4:
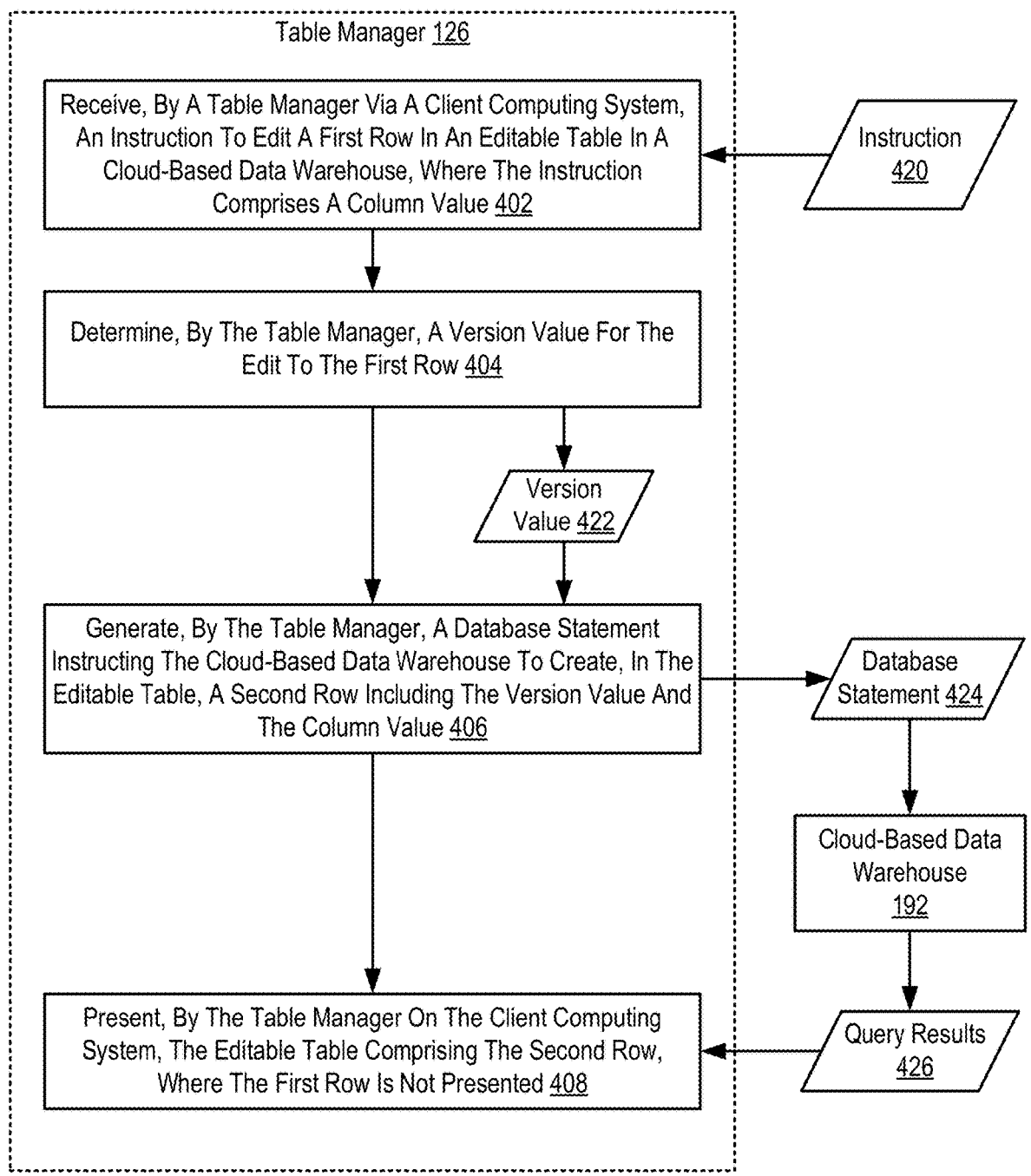
FIG. 4 sets forth a flow chart illustrating an exemplary method for versioning in editable tables according to embodiments of the present invention.

For further explanation, FIG. 4 sets forth a flow chart illustrating an exemplary method for versioning in editable tables according to embodiments of the present invention that includes receiving 402, by a table manager 126 via a client computing system, an instruction 420 to edit a first row in an editable table in a cloud-based data warehouse 192, wherein the instruction 420 comprises a column value. Receiving 402 the instruction 420 to edit a first row in an editable table in a cloud-based data warehouse 192 may be carried out by detecting that a user has manipulated elements of the GUI and/or submitted data using the GUI such that the generation of the instruction 420 is triggered, and the instruction 420 is sent to the table manager 126.

The editable table is a table on the cloud-based data warehouse 192 within which the first row is being edited. The editable table may be any table on the cloud-base data warehouse that the user and/or the table manager has authorization to edit. The editable table may also be a table that the user and/or the table manager does not have authorization to edit or does not desire to edit, but may be added to using a companion table. The editable table may include any number of columns and rows. When presented on the GUI on the client computing system, only a portion of the columns may be displayed while others are hidden and not presented. Such hidden columns may include the version value, primary key value, and sequence value.

The instruction 420 may be received in the form of a state specification from the GUI. Specifically, each change to the GUI may result in a new or updated state specification 420 that operates as an instruction to the table manager 126. The initial presentation of the editable table may be in response to a table request made through the GUI. For example, a user of the client computing system may select the editable table from a group of tables presented for display on the GUI. The instruction 420 to edit the first row may be received without presenting 402 the editable table.

The instruction 420 to edit the first row may include column values for at least one column in the row. A column value is a value for a particular column. For example, "LG", "Denon", and "HTD" are values for column B in Table 1. The new column values may be received in response to the user overwriting an existing column value presented in the GUI with the new column value. The instruction 420 to edit the first row may also be an instruction to move the first row to a different location within the editable table. A move instruction may include an indication of the location in the editable table for the first row. The location may be received as an identifier of one or more adjacent rows. The instruction 420 to edit the first row may also include the primary key of the first row.

The method of FIG. 4 also includes determining 404, by the table manager 126, a version value for the edit to the first row. A version value is an identifier of a particular state within the evolution of the editable table. Each change made to the editable table, including edits to rows, may be associated with a particular version value. Changes made to the editable table that share a particular characteristic may be grouped together by the same or similar version numbers. Such a particular characteristic of the edits may include edits made during a particular period of time and/or by a particular user or group of users. For example, edits made to the editable table during the same week may each have the same version value. Version values may increase with time (or decrease if negative numbers are used).

Determining 404 the version value for the edit to the first row may be carried out by retrieving a current version value from a version engine. A version engine is a mechanism that generates the version value for a particular edit. For example, the version engine may store the version value associated with the current time period. The version engine may generate the version value for the current edit based on, for example, date and time, user making the edit, characteristics of the user making the edit (such as title or geographical location of the user), and type of edit being made (such as addition or replacement or location within the editable table of the edit). Determining 404 the version value for the edit to the first row may also be carried out by calculating a current version based on current conditions of the system. For example, the version value may be calculated by truncating a portion of the current time and date.

The method of FIG. 4 also includes generating 406, by the table manager 126, a database statement 424 instructing the cloud-based data warehouse 192 to create, in the editable table, a second row including the version value and the column value. Instead of changing the first row in the editable table on the cloud-based data warehouse 192, the second row is created to be presented instead of the first row for requests for the version of the editable table greater than or equal to the version value for the second row and less than any greater version value of the same row created at a later date. For example, if the first row includes a version value of 2.0, the second row may include a version value of 2.1. Any request for the editable table with a version of 2.1 or greater will be presented with the second row (until a later version of the second row is created). Similarly, any request for the editable table with a version between 2.0 (inclusive) and 2.1 (exclusive), will be presented with the first row.

The first row and the second row may both include the same primary key value. A primary key value is a value that uniquely identifies a row across edits made to that row. Having the same primary key value indicates that the first row and the second row are different versions of a same row. Different versions of the same row may share the same primary key value. Because the second row is an edited version of the first row, both the first row and the second row will have the same primary key value but different version values.

Generating 406 the database statement 424 may be carried out by converting the column value, the version value, and a primary key value into a database statement targeting the database on the cloud-based data warehouse 192. Specifically, the column value, version value, and primary key value may be used to populate a database statement that creates the second row on the editable table. Generating 406 the database statement 424 may also be carried out by generating an intermediate representation from which the updated editable table may be presented to a user while the changes to the editable table on the database in the cloud-based data warehouse are pending. The table manager 126 may intercept subsequent requests for the editable table and include the second row in the query results for the editable table by incorporating the edits from the intermediate representation.

Generating 406 the database statement 424 may also include various other intermediate forms, including an abstract syntax tree, a canonicalized hierarchy, a worksheet algebra, and a relational algebra. During each of these intermediate forms, the table manager 126 may optimize the database statement to efficiently retrieve the initial results from the database. The resulting database statement may be a structured query language statement (SQL).

The method of FIG. 4 also includes presenting 408, on the client computing system by the table manager 126, the editable table comprising the second row, wherein the first row is not presented. Presenting 408, on the client computing system, the editable table may be carried out by sending another database statement requesting the latest version of the editable table. The query results 426 of the database statement from the cloud-based data warehouse may be organized to arrange the rows of the data set to display the editable table in the GUI of the client computing system. If the second row is part of the latest version of the editable table, then the second row will be presented. The first row will be hidden and not presented as the first row includes an earlier version value than the second row.

The editable table on the cloud-base data warehouse 192 may include a sequence column. The sequence column may dictate the order that the rows appear. Different versions of the same row may include the same sequence number unless an edit is made to the row that moves the row to a different location in the editable table. Consequently, the second row will include the same sequence number as the first row unless the edit to the first row included a change to the location of the first row.

TABLE 1

| Version | Primary Key | Sequence | Column A | Column B | Column C |
|---|---|---|---|---|---|
| 2.0 | 11045 | 0.5 | Television | LG | 55" C1 Series |
| 2.3 | 11046 | 0.625 | Receiver | Denon | AVR-S960H |
| 2.0 | 11046 | 0.625 | Receiver | Denon | AVR-X1600H |
| 1.5 | 11046 | 0.625 | Receiver | Yamaha | RX-A780 |
| 1.75 | 11047 | 0.6875 | Center Speaker | Elac | C52 |
| 2.0 | 11048 | 0.75 | Front Speakers | Monitor Audio | C150 |
| 2.1 | 11049 | 0.875 | Subwoofer | Rythmik | L12 |

Table 1 depicts an example editable table as it may exist on the cloud-based data warehouse 192. Using the terms above, assume the instruction 420 is to edit the row "Front Speakers—Monitor Audio—C150". The edit changes column B to "HTD" and column C to "Level Three". Once the edit is received, the table manager 126 determines the version value for the edit as "23". The table manager 126 then generates the database statement 424 as an instruction to create a new row with the same primary key value and sequence value of the "Front Speakers—Monitor Audio—C150" row. The new row is to include the column values "Front Speakers—HTD—Level Three" for columns A, B, and C respectively. Table 2 depicts the same table as Table 1 but after the addition of the new row.

TABLE 2

| Version | Primary Key | Sequence | Column A | Column B | Column C |
|---|---|---|---|---|---|
| 2.0 | 11045 | 0.5 | Television | LG | 55" C1 Series |
| 2.3 | 11046 | 0.625 | Receiver | Denon | AVR-S960H |
| 2.0 | 11046 | 0.625 | Receiver | Denon | AVR-X1600H |
| 1.5 | 11046 | 0.625 | Receiver | Yamaha | RX-A780 |
| 1.75 | 11047 | 0.6875 | Center Speaker | Elac | C52 |
| 2.3 | 11048 | 0.75 | Front Speakers | HTD | Level Three |
| 2.0 | 11048 | 0.75 | Front Speakers | Monitor Audio | C150 |
| 2.1 | 11049 | 0.875 | Subwoofer | Rythmik | L12 |

Finally, Table 3 depicts the editable table as presented on the GUI of the client computing system in response to requesting the latest version of the editable table. The version column, primary key column, and sequence column are hidden from the display.

TABLE 3

| Column A | Column B | Column C |
|---|---|---|
| Television | LG | 55" C1 Series |
| Receiver | Denon | AVR-S960H |
| Center Speaker | Elac | C52 |
| Front Speakers | HTD | Level Three |
| Subwoofer | Rythmik | L12 |

The above limitations improve the operation of the computer system by creating a single editable table that includes multiple viewable versions of the same editable table. This is accomplished by creating a new row each time an edit is made. This is further accomplished by storing, invisible to the user, a version number in the row with a primary key indicating the same row across edits.

Figure 5:
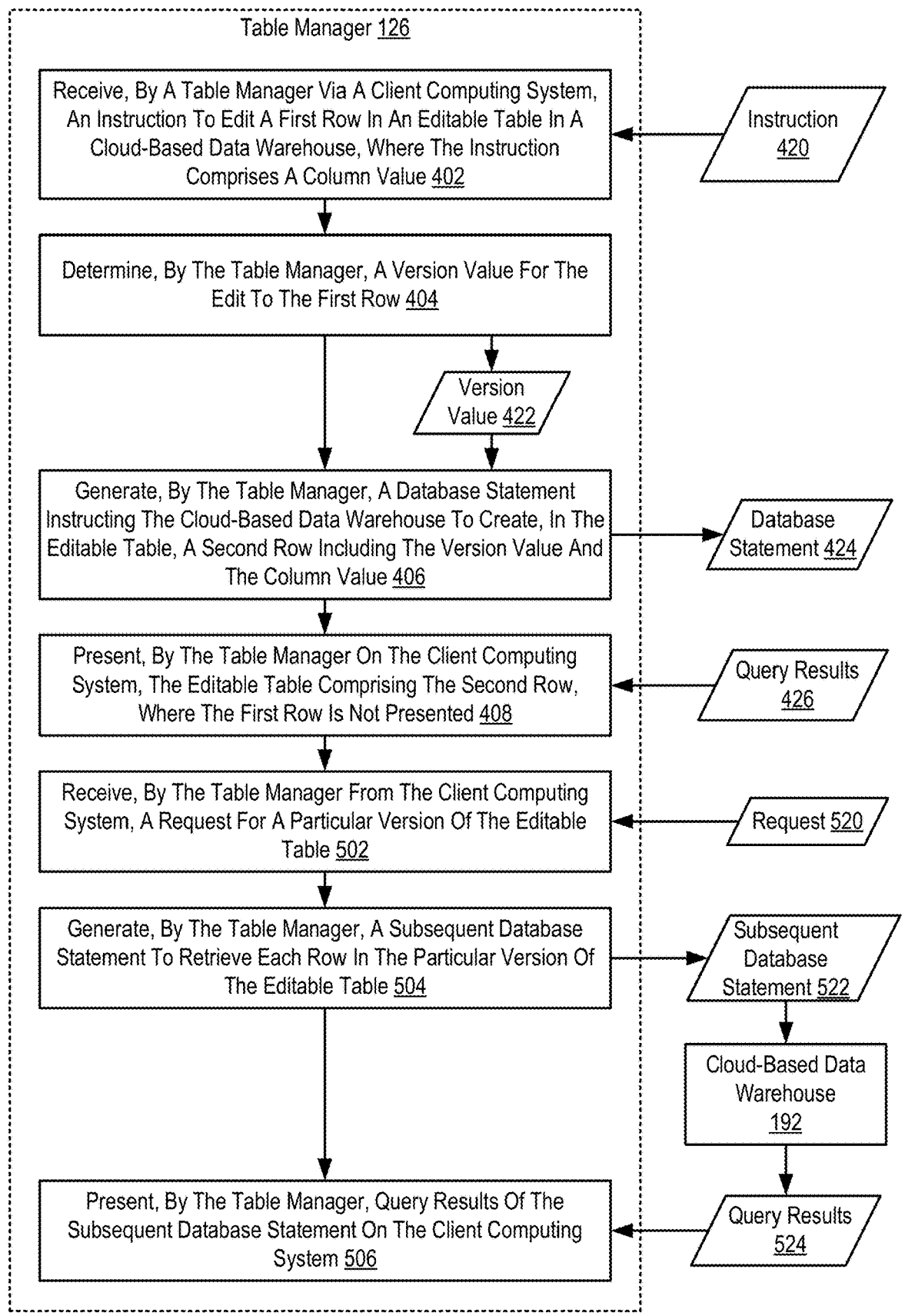
FIG. 5 sets forth a flow chart illustrating an exemplary method for versioning in editable tables according to embodiments of the present invention.

For further explanation, FIG. 5 sets forth a flow chart illustrating a further exemplary method for versioning in editable tables according to embodiments of the present invention that includes receiving 402, by a table manager 126 via a client computing system, an instruction 420 to edit a first row in an editable table in a cloud-based data warehouse 192, wherein the instruction 420 comprises a column value; determining 404, by the table manager 126, a version value for the edit to the first row; generating 406, by the table manager 126, a database statement 424 instructing the cloud-based data warehouse 192 to create, in the editable table, a second row including the version value and the column value; and presenting 408, on the client computing system by the table manager 126, the editable table comprising the second row, wherein the first row is not presented.

The method of FIG. 5 differs from the method of FIG. 4, however, in that FIG. 5 further includes receiving 502, by the table manager 126 from the client computing system, a request 520 for a particular version of the editable table. Receiving 502 the request 520 for a particular version of the editable table may be carried out by detecting that a user has manipulated elements of the GUI and/or submitted data using the GUI such that the generation of the request 520 is triggered, and the request 520 is sent to the table manager 126. The request 520 may be received in the form of a state specification from the GUI. The request 520 may include an identifier of the requested version.

The method of FIG. 5 also includes generating 504, by the table manager 126, a subsequent database statement 522 to retrieve each row in the particular version of the editable table. Generating 504 the subsequent database statement 522 to retrieve each row in the particular version of the editable table may be carried out by generating the subsequent database statement 522 to select, for each primary key value, a row with a highest version value that does not exceed the requested particular version of the editable table. Specifically, the subsequent database statement 522 may be orchestrated to iterate through each row in the editable table and select one row for each primary key. The row for each primary key is selected by determining the row with the highest version number that does not exceed the requested particular version number. Each row that has a version number that is lower than the highest version number that does not exceed the requested particular version number is not included in the query results. Similarly, any row that has a version number higher than the requested particular version number is also not included in the query results.

If a row is deleted from the editable table, a new row with the same primary key as the deleted row may be created. The new row may be assigned the current version value that is higher than the deleted row. The new row may have a special indicator (e.g., a value in an additional column) that indicates that no row with that primary key should be selected for the particular version indicated by the version value in the new row.

The method of FIG. 5 also includes presenting 506, by the table manager 126, query results 524 of the subsequent database statement 522 on the client computing system. Presenting 506 the query results 524 of the subsequent database statement 522 on the client computing system may be carried out by organizing the rows of the particular version of the editable table in the GUI of the client computing system. The rows may be organized according to a sequence value for each row.

For example, assume that the request 520 is for version 2.0 of the table depicted in Table 2. The table manager 126 generates a database statement to retrieve each row in version 2.0 of the table. The cloud-based data warehouse, upon receiving the database statement, iterates through the rows of the editable table and selects, for each primary key value, the row with the highest version value that does not exceed the requested version value. Table 4 depicts the example query results from the subsequent database statement 522. Note that the version column, primary key column, and sequence column would be hidden from display on the GUI of the client computing system.

TABLE 4

| Version | Primary Key | Sequence | Column A | Column B | Column C |
|---------|-------------|----------|----------|----------|----------|
| 2.0 | 11045 | 0.5 | Television | LG | 55" C1 Series |
| 2.0 | 11046 | 0.625 | Receiver | Denon | AVR-X1600H |
| 1.75 | 11047 | 0.6875 | Center Speaker | Elac | C52 |
| 2.0 | 11048 | 0.75 | Front Speakers | Monitor Audio | C150 |

Figure 6:
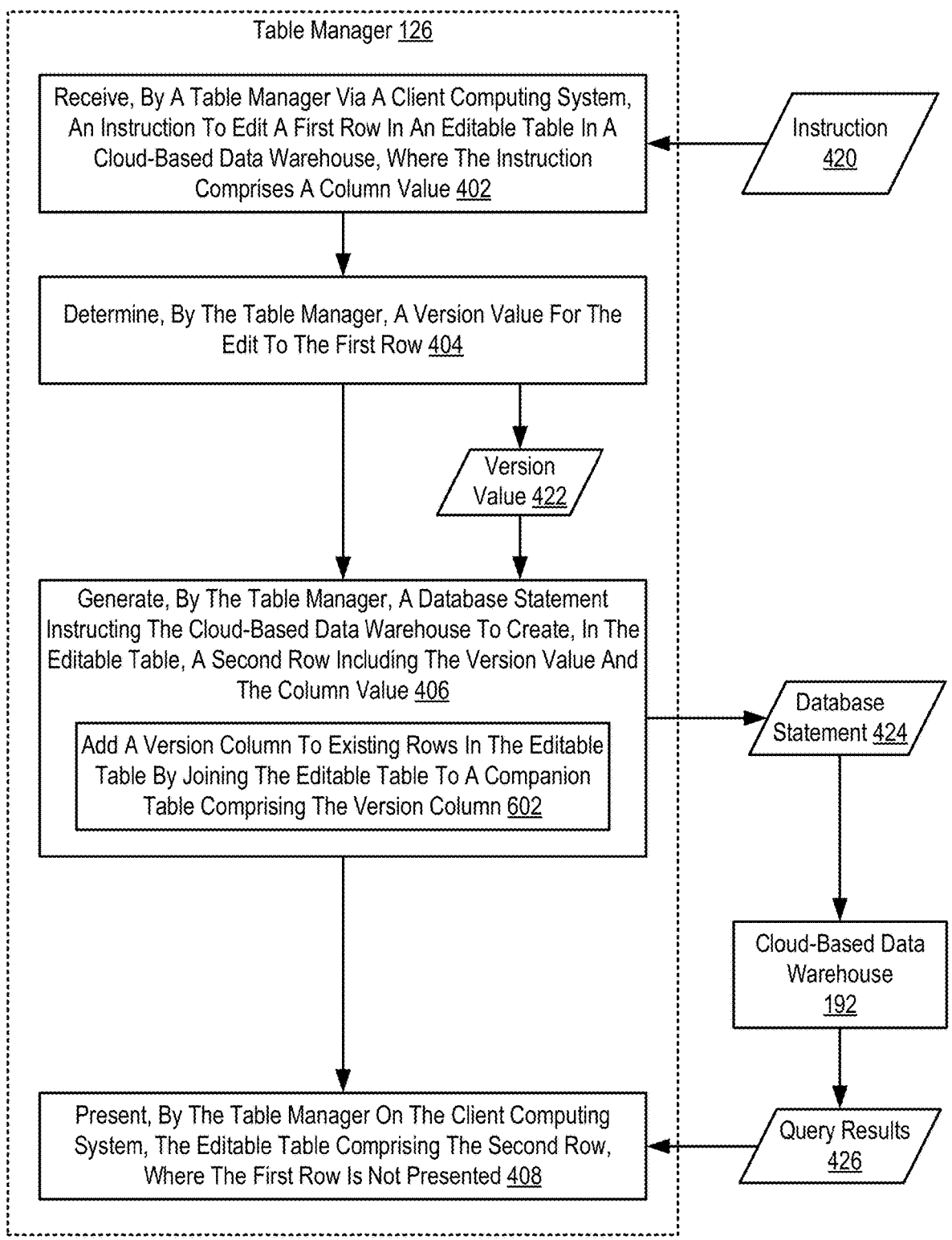
FIG. 6 sets forth a flow chart illustrating an exemplary method for versioning in editable tables according to embodiments of the present invention.

For further explanation, FIG. 6 sets forth a flow chart illustrating a further exemplary method for versioning in editable tables according to embodiments of the present invention that includes receiving 402, by a table manager 126 via a client computing system, an instruction 420 to edit a first row in an editable table in a cloud-based data warehouse 192, wherein the instruction 420 comprises a column value; determining 404, by the table manager 126, a version value for the edit to the first row; generating 406, by the table manager 126, a database statement 424 instructing the cloud-based data warehouse 192 to create, in the editable table, a second row including the version value and the column value; and presenting 408, on the client computing system by the table manager 126, the editable table comprising the second row, wherein the first row is not presented.

The method of FIG. 6 differs from the method of FIG. 4, however, in that generating 406, by the table manager 126, a database statement 424 instructing the cloud-based data warehouse 192 to create, in the editable table, a second row including the version value and the column value includes adding 602 a version column to existing rows in the editable table by joining the editable table to a companion table comprising the version column. Adding 602 a version column to existing rows in the editable table by joining the editable table to a companion table may be carried out by creating the companion table on the cloud-based data warehouse. The companion table is database table to which edits are made and the versioning column is added to avoid directly editing the editable table on the cloud-based data warehouse 192. The versioning row in the companion table may apply a version value to existing rows in the editable table. The database statement 424 may create the second row on the companion table within the database on the cloud-based data warehouse 192. When retrieving the editable table from the cloud-based data warehouse 192, the database statement combines the editable table with the companion table and presents the resulting combination on the GUI. When utilizing a companion table, the user need not have authorization to edit the editable table. The relationship between the companion table and editable table is based on the primary key values, such that a row from the original table is "version 1" and all rows in the companion are "version 2" or beyond.

In view of the explanations set forth above, readers will recognize that the benefits of versioning in editable tables according to embodiments of the present invention include:
Improving the operation of the computer system by creating a single editable table that includes multiple viewable versions of the same editable table, increasing system utility and efficiency. This is accomplished by creating a new row each time an edit is made. This is further accomplished by Improving the operation of a computing system by creating a new row each time an edit is made, preserving overwritten data and increasing system stability.

Improving the operation of a computing system by storing, invisible to the user, a version number in the row with a primary key indicating the same row across edits, increasing system robustness.

Exemplary embodiments of the present invention are described largely in the context of a fully functional computer system for versioning in editable tables. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for versioning in editable tables, the method comprising:
   receiving, by a table manager from a client computing system, an instruction to edit a first row in an editable table in a cloud-based data warehouse, wherein the instruction comprises an indication that a location of the first row within the editable table has changed, and wherein the first row in the editable table on the cloud-based data warehouse comprises a current sequence number and a current version value;
   determining, by the table manager, an updated version value for the edit to the first row; and
   generating, by the table manager, a database statement instructing the cloud-based data warehouse to create, in the editable table, a second row including the updated version value and an updated sequence value indicating the changed location of the first row in the editable table,
   wherein the table manager is hosted by an intermediary computing system separate from the client computing system and the cloud-based data warehouse, and wherein the cloud-based data warehouse creates the second row in response to receiving the database statement.

2. The method of claim 1, further comprising: presenting, on the client computing system by the table manager, the editable table comprising the second row, wherein the first row is not presented.

3. The method of claim 1, further comprising:
   receiving, by the table manager from the client computing system, a request for a particular version of the editable table;
   generating, by the table manager, a subsequent database statement to retrieve each row in the particular version of the editable table; and
   presenting, by the table manager, query results of the subsequent database statement on the client computing system.

4. The method of claim 3, wherein the database statement to retrieve each row in the particular version of the editable table selects, for each primary key value, a row with a highest version value that does not exceed the requested particular version of the editable table.

5. The method of claim 1, wherein generating, by the table manager, the database statement comprises adding a version column to existing rows in the editable table by joining the editable table to a companion table comprising the version column.

6. The method of claim 1, wherein the first row and the second row comprise a same primary key value indicating that the first row and the second row are different versions of a same row.

7. The method of claim 1, wherein determining the updated version value for the edit to the first row comprises retrieving the updated version value from a version engine.

8. The method of claim 1, wherein the updated version value for the second row is greater than the current version value for the first row.

9. The method of claim 1, wherein the database statement is a structured query language statement.

10. An apparatus for versioning in editable tables, the apparatus comprising a computer processor, a computer memory operatively coupled to the computer processor, the computer memory having disposed within it computer program instructions that, when executed by the computer processor, cause the apparatus to carry out the steps of:
    receiving, by a table manager from a client computing system, an instruction to edit a first row in an editable table in a cloud-based data warehouse, wherein the instruction comprises an indication that a location of the first row within the editable table has changed, and wherein the first row in the editable table on the cloud-based data warehouse comprises a current sequence number and a current version value;
    determining, by the table manager, an updated version value for the edit to the first row; and
    generating, by the table manager, a database statement instructing the cloud-based data warehouse to create, in the editable table, a second row including the version value and an updated sequence value indicating the changed location of the first row in the editable table,
    wherein the table manager is hosted by an intermediary computing system separate from the client computing system and the cloud-based data warehouse, and wherein the cloud-based data warehouse creates the second row in response to receiving the database statement.

11. The apparatus of claim 10, wherein the computer program instructions further cause the apparatus to carry out the step of: presenting, on the client computing system, the editable table comprising the second row, wherein the first row is not presented.

12. The apparatus of claim 10, wherein the computer program instructions further cause the apparatus to carry out the steps of:
    receiving, from the client computing system, a request for a particular version of the editable table;

generating a subsequent database statement to retrieve each row in the particular version of the editable table; and presenting query results of the subsequent database statement on the client computing system.

13. The apparatus of claim 12, wherein the database statement to retrieve each row in the particular version of the editable table selects, for each primary key value, a row with a highest version value that does not exceed the requested particular version of the editable table.

14. The apparatus of claim 10, wherein generating the database statement comprises adding a version column to existing rows in the editable table by joining the editable table to a companion table comprising the version column.

15. The apparatus of claim 10, wherein the first row and the second row comprise a same primary key value indicating that the first row and the second row are different versions of a same row.

16. The apparatus of claim 10, wherein determining the updated version value for the edit to the first row comprises retrieving the updated version value from a version engine.

17. The apparatus of claim 10, wherein the version value for the second row is greater than the current version value for the first row.

18. A computer program product for versioning in editable tables, the computer program product comprising a non-transitory computer readable storage medium, the computer program product comprising computer program instructions that, when executed, cause a computer to carry out the steps of:

receiving, by a table manager from a client computing system, an instruction to edit a first row in an editable table in a cloud-based data warehouse, wherein the instruction comprises an indication that a location of the first row within the editable table has changed, and wherein the first row in the editable table on the cloud-based data warehouse comprises a current sequence number and a current version value;

determining, by the table manager, an updated version value for the edit to the first row; and generating, by the table manager, a database statement instructing the cloud-based data warehouse to create, in the editable table, a second row including the version value and an updated sequence value indicating the changed location of the first row in the editable table, wherein the table manager is hosted by an intermediary computing system separate from the client computing system and the cloud-based data warehouse, and wherein the cloud-based data warehouse creates the second row in response to receiving the database statement.

* * * * *